(134.)

JAMES A. MACAULEY.
Improvement in Motor for Sewing Machines.

No. 121,532.　　　　　　　　　　　　　　　　　Patented Dec. 5, 1871.

WITNESSES.　　　　　　　　　　　　　　　　　INVENTOR.

UNITED STATES PATENT OFFICE.

JAMES A. MACAULEY, OF WHEELING, WEST VIRGINIA, ASSIGNOR TO HIMSELF AND JOHN MACAULEY, SR., OF SAME PLACE.

IMPROVEMENT IN MOTORS FOR SEWING-MACHINES.

Specification forming part of Letters Patent No. 121,532, dated December 5, 1871.

*To all whom it may concern:*

Be it known that I, JAMES A. MACAULEY, of the city of Wheeling, in the county of Ohio and State of West Virginia, have invented certain Improvements in Sewing-Machines, of which the following is a specification, reference being had to the accompanying drawing and the letters of reference thereon.

My invention relates to the driving of the machinery of a sewing-machine by a power produced by one or more springs; and is a combination consisting of one or more springs, the necessary wheels, (hereinafter described,) the common driving-wheel of a sewing-machine, and a foot-break to control the speed and to stop the machine.

Figure 2:
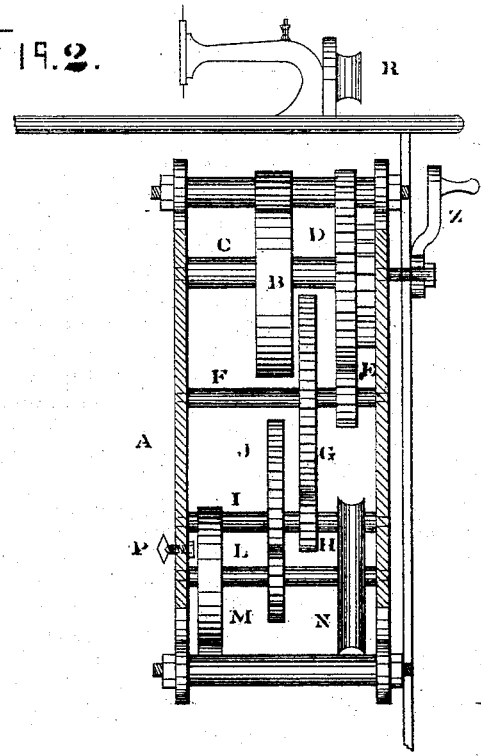
Figure 1:
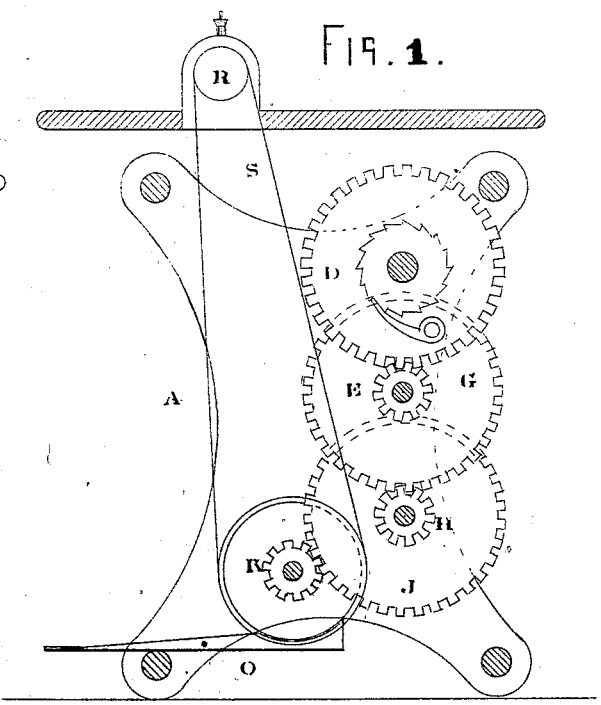

In the drawing, Figure 1 is a side or sectional view, showing the wheels and their relative arrangement, and their connection with the drive-wheel on the sewing-machine. Fig. 2 is an end or front view, showing the same as shown in Fig. 1, and, in addition thereto, the spring and band-wheel.

Like letters indicate like parts.

A, case inclosing wheels, &c.; B, spring on axis C; D, large wheel (cog or band) on axis C; E, small wheel on axis F, and which engages with wheel D; G, large wheel on axis F; H, small wheel on axis I; J, large wheel on axis I; M, brake-wheel on axis L; K, small wheel on axis L; N, small wheel on axis L; O, lever-brake; P, set-screw; R, driving-wheel on sewing-machine; S, strap or band extending from wheel N to wheel R; T, ratchet on wheel D.

Figure 3:
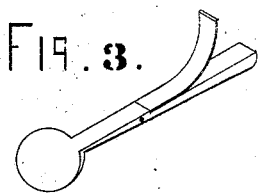

When the above parts are firmly set up and connected with a sewing-machine the operation is briefly the following: The spring or springs being wound around the axis by means of crank Z, it gives motion to the series of wheels through wheel D, thereby propelling strap-wheel N, which drives wheel R of the sewing-machine by means of the strap or band S. The speed may be regulated in two ways—one by the set-screw P, by screwing it against wheel M; the other by the foot-brake O, by pressing it gently against wheel M. The rigidness of this brake may be obviated by a spring affixed to it, as shown in Fig. 3.

It is obvious that the machine may be stopped by either this set-screw or foot-brake. Should one spring not give enough power, as many as may be necessary so to do may be added on axis C; and in which case the attachments of their outside ends had better be on alternate or opposite supports, as such have a tendency to equalize their pressure on the common axis. As it is desirable that the spring should not run off too rapidly, but run for a given time, the wheels must be of a given size to enable it so to run at a given speed, from which it is obvious that the same can be effected by the addition of more wheels; for example, the wheels used by me could be even doubled in number and lessened in size. The wheels used may be either cogged or band-wheels, or partly of both.

What I claim as my invention, and desire to secure by Letters Patent, is—

The spring B, wheels D, E, G, H, L, K, M, and N, in combination with each other, and in combination with brake O and driving-wheel R, constructed and operated as described.

JAMES A. MACAULEY.

Witnesses:
J. B. MCLURE,
STANTON M. HOWARD.

(134)